US011708886B2

(12) United States Patent
Sabti et al.

(10) Patent No.: US 11,708,886 B2
(45) Date of Patent: Jul. 25, 2023

(54) SINGLE SPRING, TORSIONALLY COMPLIANT, OVERRUNNING DECOUPLER

(71) Applicant: Litens Automotive Partnership, Woodbridge (CA)

(72) Inventors: Ali Sabti, Kleinburg (CA); John R. Antchak, Aurora (CA); Warren Williams, Oakville (CA); Daniel Thornton, Etobicoke (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 509 days.

(21) Appl. No.: 16/640,545

(22) PCT Filed: Sep. 7, 2018

(86) PCT No.: PCT/CA2018/051095
§ 371 (c)(1),
(2) Date: Feb. 20, 2020

(87) PCT Pub. No.: WO2019/046957
PCT Pub. Date: Mar. 14, 2019

(65) Prior Publication Data
US 2020/0355256 A1 Nov. 12, 2020

Related U.S. Application Data

(60) Provisional application No. 62/555,448, filed on Sep. 7, 2017.

(51) Int. Cl.
*F16H 55/36* (2006.01)
*B60K 25/02* (2006.01)
(Continued)

(52) U.S. Cl.
CPC .............. *F16H 55/36* (2013.01); *B60K 25/02* (2013.01); *F16D 3/12* (2013.01); *F16D 13/76* (2013.01);
(Continued)

(58) Field of Classification Search
CPC .......... F16D 41/206; F16D 3/12; F16D 13/76; F16D 47/04; F16H 55/36; F16H 7/20; B60K 25/02
See application file for complete search history.

(56) References Cited

U.S. PATENT DOCUMENTS 773,320 A 10/1904 Haase
2,396,985 A 3/1946 Burrus
(Continued)

FOREIGN PATENT DOCUMENTS

CN 101395398 A 3/2009
DE 19501685 C1 1/1995
(Continued)

OTHER PUBLICATIONS

Second Office Action for CN201180030973 dated May 11, 2015.
(Continued)

*Primary Examiner* — Lori Wu
(74) *Attorney, Agent, or Firm* — Aird & McBurney LP

(57) ABSTRACT

A decoupler pulley is provided for automotive belt-driven accessory drives, which utilizes a single torsion coil spring that provides torsional resiliency and overrunning functionality. As the torsion spring expands it increasingly pinches a bushing disposed between a radially expansible hub and pulley to thereby provide proportional damping.

14 Claims, 4 Drawing Sheets

(51) Int. Cl.
  *F16D 3/12* (2006.01)
  *F16D 13/76* (2006.01)
  *F16D 41/20* (2006.01)
  *F16D 47/04* (2006.01)
  *F16H 7/20* (2006.01)

(52) U.S. Cl.
  CPC .......... *F16D 41/206* (2013.01); *F16D 47/04* (2013.01); *F16H 7/20* (2013.01)

(56) References Cited

U.S. PATENT DOCUMENTS

| | | | |
|---|---|---|---|
| 2,486,149 A | 10/1949 | Gorske et al. | |
| 2,551,739 A | 5/1951 | Harlan | |
| 2,633,953 A | 4/1953 | Gorske | |
| 2,794,524 A | 6/1957 | Sacchini et al. | |
| 2,829,748 A | 4/1958 | Sacchini et al. | |
| 2,866,349 A | 12/1958 | Heckenthorn | |
| 2,885,896 A | 5/1959 | Hungerford, Jr. et al. | |
| 2,968,380 A | 1/1961 | Sacchini | |
| 3,059,493 A | 10/1962 | Wolfram | |
| RE25,559 E | 4/1964 | Travis et al. | |
| 3,242,696 A | 3/1966 | Kaplan | |
| 3,298,486 A | 1/1967 | Perryman | |
| 3,618,730 A | 11/1971 | Mould | |
| 4,460,076 A | 7/1984 | Yamada | |
| 4,473,362 A | 9/1984 | Thomey et al. | |
| 4,583,962 A | 4/1986 | Bytzek et al. | |
| 4,689,037 A | 8/1987 | Bytzek | |
| 4,698,049 A | 10/1987 | Bytzek et al. | |
| 4,725,260 A | 2/1988 | Komowski et al. | |
| 4,816,012 A | 3/1989 | Bytzek | |
| 4,824,421 A | 4/1989 | Komorowski | |
| 4,886,484 A | 12/1989 | Hanes | |
| 4,973,292 A | 11/1990 | Mevissen | |
| 5,139,463 A | 8/1992 | Bytzec et al. | |
| 5,156,573 A | 10/1992 | Bytzec et al. | |
| RE34,543 E | 2/1994 | Komorowski | |
| RE34,616 E | 5/1994 | Komowski et al. | |
| 5,437,205 A | 8/1995 | Tseng | |
| 5,598,913 A | 2/1997 | Monahan et al. | |
| 5,722,909 A | 3/1998 | Thomey | |
| 5,879,254 A | 3/1999 | Tanaka | |
| 5,919,107 A | 7/1999 | Stepniak | |
| 6,196,940 B1 | 3/2001 | Lehtovaara | |
| 6,394,247 B1 | 5/2002 | Monahan et al. | |
| 6,394,248 B1 | 5/2002 | Monahan et al. | |
| 6,458,055 B1 | 10/2002 | Bellamy-Booth | |
| 6,464,604 B1 | 10/2002 | Frankowski et al. | |
| 6,506,137 B2 | 1/2003 | Guhr | |
| 6,605,013 B2 | 8/2003 | Chambers et al. | |
| 6,676,548 B2 | 1/2004 | Fujiwara | |
| 6,761,656 B2 | 7/2004 | King et al. | |
| 6,857,979 B2 | 2/2005 | Macnaughton et al. | |
| 7,011,191 B2 | 3/2006 | Spicer et al. | |
| 7,052,420 B2 | 5/2006 | King et al. | |
| 7,070,033 B2 | 7/2006 | Jansen et al. | |
| 7,140,992 B2 | 11/2006 | Dix et al. | |
| 7,153,227 B2 | 12/2006 | Dell et al. | |
| 7,207,910 B2 | 4/2007 | Dell et al. | |
| 7,591,357 B2 | 9/2009 | Antchak et al. | |
| 7,618,337 B2 | 11/2009 | Jansen et al. | |
| 7,624,852 B2 | 12/2009 | Mevissen et al. | |
| 7,712,592 B2 | 5/2010 | Jansen et al. | |
| 2002/0104730 A1 | 8/2002 | Terada | |
| 2004/0014540 A1 | 1/2004 | Dell et al. | |
| 2004/0112700 A1* | 6/2004 | Liston | F16H 55/36 192/41 S |
| 2008/0194339 A1 | 8/2008 | Antchak et al. | |
| 2009/0176583 A1* | 7/2009 | Dell | F16D 3/72 464/40 |
| 2011/0065537 A1 | 3/2011 | Serkh | |
| 2011/0245000 A1* | 10/2011 | Serkh | F16H 55/36 474/94 |
| 2014/0141892 A1 | 5/2014 | Williams et al. | |
| 2015/0060232 A1* | 3/2015 | Tran | F16F 15/123 192/41 S |
| 2017/0122425 A1* | 5/2017 | Schneider | F16D 13/76 |
| 2018/0087599 A1* | 3/2018 | Replete | B60K 25/02 |
| 2019/0136957 A1* | 5/2019 | Shimamura | F16H 55/36 |

FOREIGN PATENT DOCUMENTS

| | | |
|---|---|---|
| DE | 4010928 C2 | 11/1998 |
| DE | 19524403 C2 | 9/2000 |
| DE | 20023355 U1 | 11/2003 |
| DE | 20220807 U1 | 5/2004 |
| DE | 20319886 U1 | 6/2005 |
| DE | 202004010411 U1 | 12/2005 |
| DE | 202005016992 U1 | 2/2006 |
| EP | 1398539 A1 | 9/2002 |
| WO | 2006081657 A1 | 8/2006 |
| WO | 2010048732 A1 | 5/2010 |
| WO | 2011160202 A1 | 12/2011 |

OTHER PUBLICATIONS

ISR and WO for PCT/CA2011/000713 dated Aug. 25, 2011.
Office Action for U.S. Appl. No. 15/239,450 dated Oct. 29, 2018.
International Search Report and Written Opinion for PCT/CA2018/051095 dated Dec. 4, 2018.

* cited by examiner

SINGLE SPRING, TORSIONALLY COMPLIANT, OVERRUNNING DECOUPLER

CROSS-REFERENCE TO RELATED APPLICATIONS

This application claims the benefit of U.S. Provisional application 62/555,448, the contents of which are incorporated herein by reference in their entirety.

FIELD OF THE DISCLOSURE

This disclosure relates to a belt drive assembly for driving belt driven accessories in an engine of an automotive vehicle, and more particularly, to a decoupling mechanism for allowing the belt driven accessories to operate temporarily at a speed other than the belt drive assembly.

BACKGROUND

In automotive vehicle engines a portion of the engine output is usually transferred to a plurality of belt driven accessories utilizing an endless serpentine belt. Typically, each component includes an input drive shaft and a pulley coupled to a distal end of the drive shaft for driving engagement with the belt. An example of such a belt driven accessory is an alternator.

It is also known to provide a decoupler operatively coupled between the pulley and the alternator to allow the alternator drive shaft to rotate at a faster speed than the pulley (overrun) and to allow the speed of the pulley to oscillate with respect to the alternator drive shaft due to oscillations in instantaneous engine speed.

U.S. Pat. No. 9,611,903 to Shimamura et al., U.S. Pat. No. 9,518,646 to Marion, U.S. Pat. No. 9,441,677 to Williams et al., and U.S. Pat. No. 5,156,573 to Bytzek et al. disclose examples of decouplers (which may be insufficiently durable in practice) that propose use of a single spring to provide torsional compliance and overrun capability.

It remains desirable to provide a single spring, torsionally compliant, overrunning decoupler that may cost less to manufacture yet may be more durable than previous designs.

SUMMARY

In one aspect, a decoupler is provided which includes a rotatable pulley, a rotatable hub, a torsion spring and a bushing. The pulley has an outer surface configured to engage a drive belt. The hub is disposed inward of the pulley, and includes a transmission drum and a connector for mounting the decoupler onto a belt-driven accessory shaft. The torsion coil spring is disposed inward of the pulley and the transmission drum. The torsion spring has a first end region including a first end pointing in a circumferential direction, a second end region including a second end pointing in a circumferential direction, and an intermediate region intermediate of the first and second end regions. The first end region of the torsion spring is connected to one of the pulley and the hub via a non-clutched connection, and the second end region of the torsion spring is connected to the other of the pulley and the hub via a clutched connection. When the pulley and hub rotate relative to one another in a direction that tends to increase the diameter of the torsion coil spring the second end region of the torsion spring is drivingly connected to the other of the pulley and the hub so as to impart the rotation of the pulley to the hub. When the pulley and hub rotate relative to one another in a direction that tends to decrease the diameter of the torsion coil spring the second end region of the torsion spring is decoupled from the other of the pulley and the hub so as to allow the hub to overrun the pulley. The bushing is disposed between the pulley and the transmission drum, enabling the pulley and hub to rotate relative to one another. The bushing is disposed substantially axially co-extensive with the axial extent of the intermediate region of the torsion spring.

The transmission drum is preferably radially expansible. As the intermediate region of the torsion coil expands outwardly the transmission drum also expands outwardly against the bushing to increasingly pinch the bushing between transmission drum and the pulley, thereby providing damping correlated to the level of positive torque applied to the pulley.

The transmission drum can include a slot therein for enabling the radial expansion.

The non-clutched connection between the pulley or the hub and the first end region of the torsion spring can be provided by at least a stop provisioned in a pocket formed in the pulley or the hub.

The pulley or the hub can include a pocket receiving the first end of the torsion spring. The non-clutched connection between the pulley or the hub and the first end region of the torsion spring can be provided at least by press fit of the first end of the torsion spring into the pocket.

The clutched connection between the second end region of the torsion spring and the hub or the pulley can be provided through wrap clutch engagement of an outer circumferential surface of the second end region of the torsion spring with a clutch engagement wall provided in the hub or pulley.

The transmission drum and the connector are preferably provisioned by separable pieces. The fixation of the connector to the belt driven accessory shaft can fix the transmission drum to the belt driven accessory shaft. The transmission drum can include a radial shoulder wall and the connector can include a radial shoulder that bears against the transmission drum radial shoulder wall when the connector is fixed to the belt driven accessory shaft.

DETAILED DESCRIPTION

Figure 1:
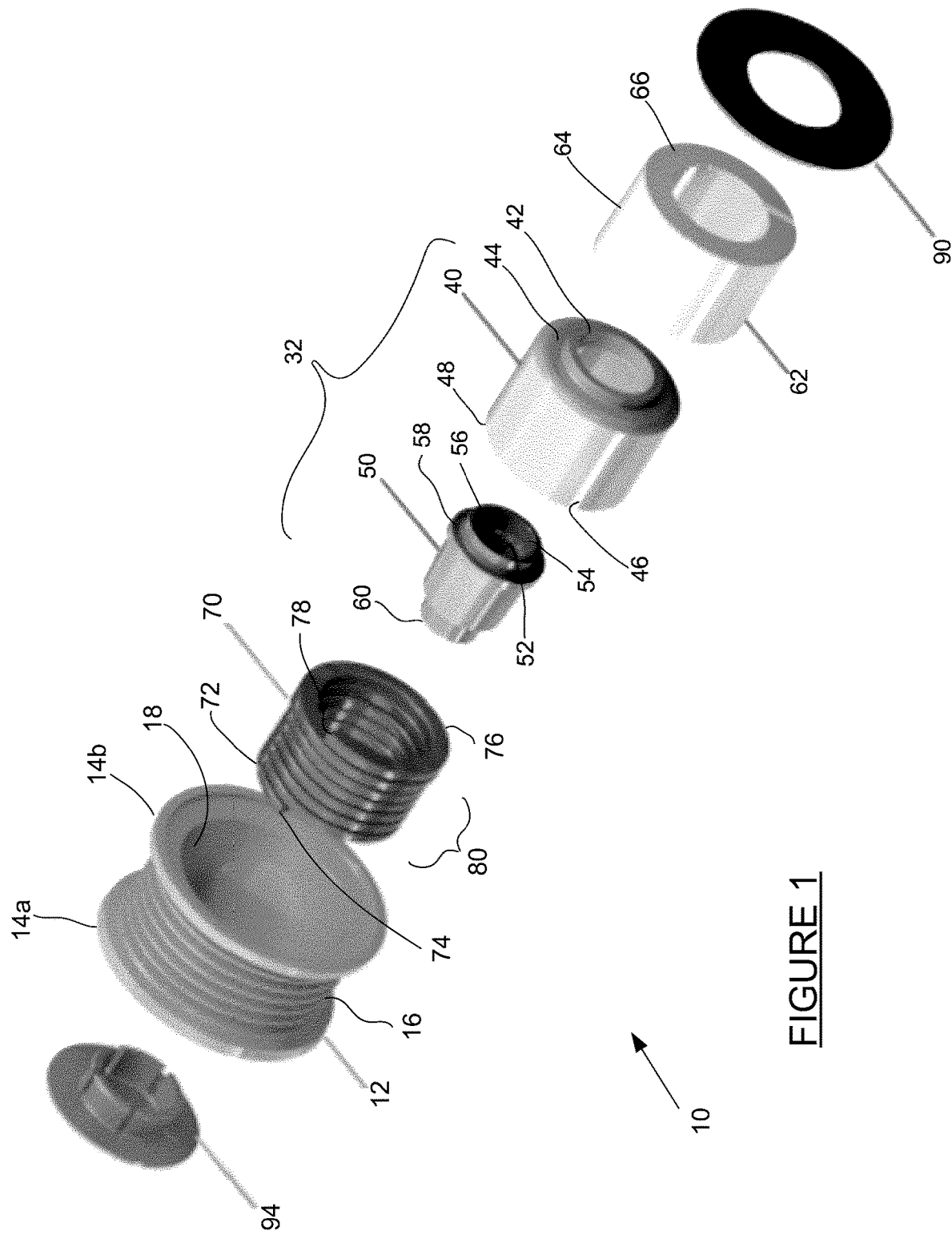
FIG. 1 is an exploded view of a decoupler pulley according to a first embodiment.
Figure 2:
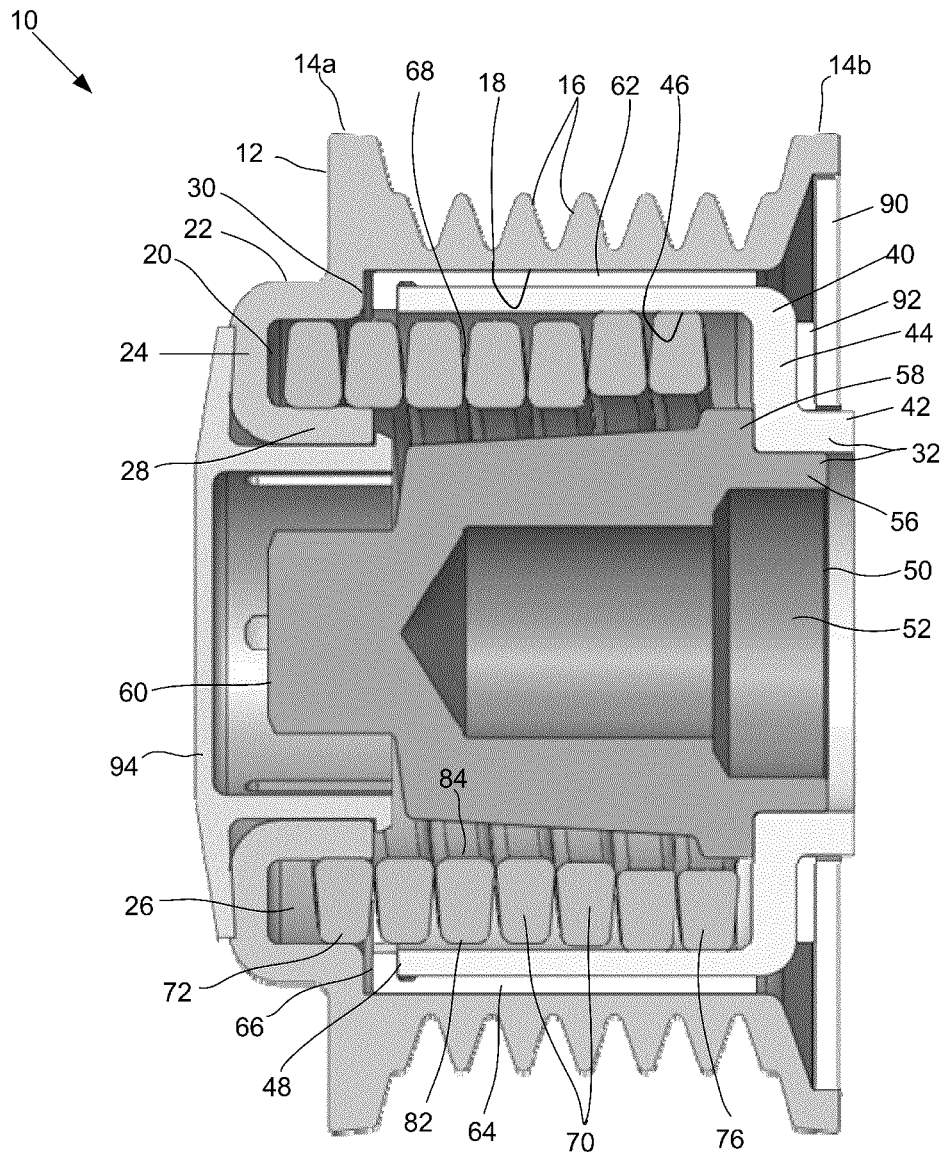
FIG. 2 is an axial cross sectional view of the first embodiment.
Figure 3:
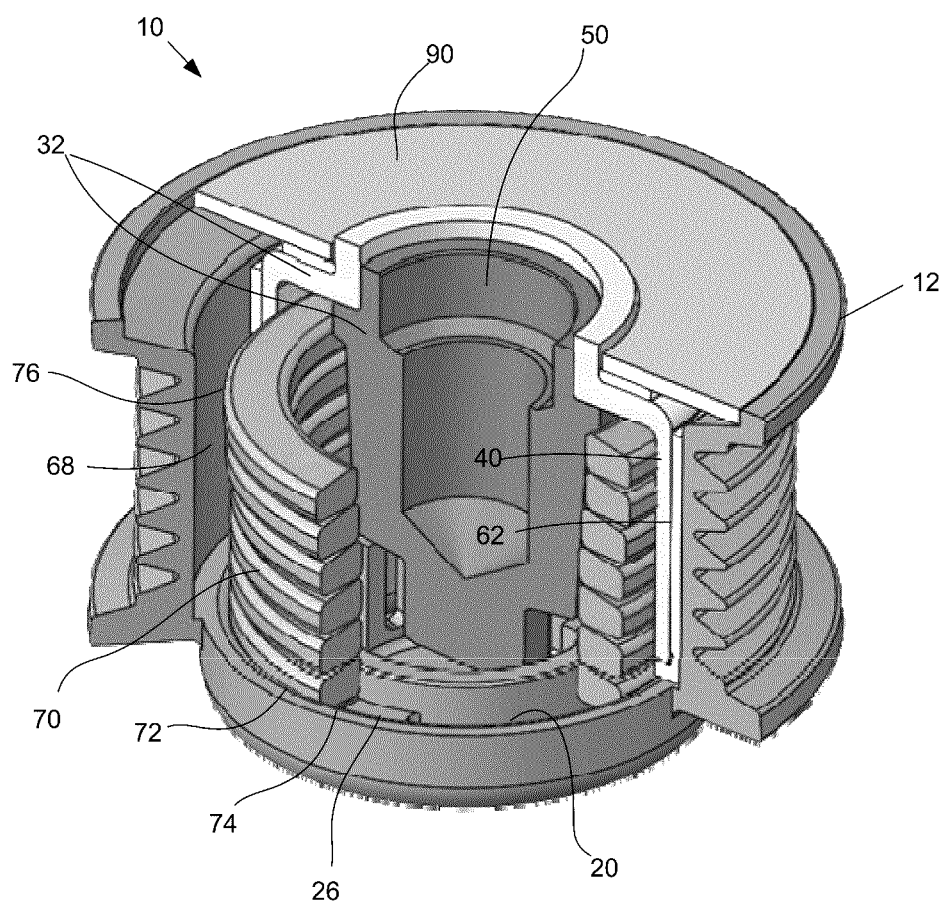
FIG. 3 is a fragmentary perspective view of the first embodiment.

FIGS. 1-3 show a decoupler pulley 10 according to a first embodiment.

The decoupler pulley 10 includes a rotatable, tubular, outer body ('pulley', for brevity) 12 having a belt engaging outer surface such as spaced-apart circumferential guide walls 14a, 14b which straddle a grooved surface 16 configured to receive a poly-V endless serpentine belt, as known in the art, for rotating the pulley. The walls 14a, 14b and the outer surface 16 may alternatively have any other configuration for mating with any other type of drive belt that may be employed in practice. Internally, the pulley 12 can have a relatively smooth interior cylindrical wall 18 opposing the outer surface 16.

As seen best in FIG. 2, one end of the pulley 12 can have an internal, axially bounded, pocket 20 formed from an outer circumferential wall 22, a radial wall 24 and an inner circumferential wall 28, which are contiguous with one another. An internal flange 30 can be provided in the transition between the interior cylindrical wall 18 and the pocket 20. The pocket 20 along with the remainder of the pulley 12 may be formed through a roll-forming process as known per se in the metal-forming arts.

As seen best in FIG. 3, a spring stop 26 can be provided in the radial wall 24. The stop 26 may be formed in the radial wall 24 via a punching operation, for example, or provided in any other manner such as through machining or affixing a block to the radial wall 24.

As seen best in FIG. 2, the decoupler 10 includes a hub 32 disposed inward of the pulley 12. The hub 32 is rotatable relative to the pulley 12 as discussed in greater detail below. The hub 32 includes two major components, a transmission drum 40 and a connector 50 for fastening the hub 32 to the shaft of a belt driven accessory such as an alternator.

The transmission drum 40 can feature a tubular stub 42, a radial shoulder wall 44 and an axially extending clutch engagement wall 46, which is disposed inward of the pulley cylindrical wall 18. The transmission drum 40 may be formed from a suitable metal, as discussed in greater detail below, and manufactured using well known roll forming techniques. In alternative embodiments, the transmission drum 40 may have other shapes, for example, the tubular stub 42 may be omitted and/or the cylindrical wall 46 may be sloped and/or may include steps therein.

The connector 50 can provide a cavity 52 for attachment to the shaft of the belt driven accessory. The cavity 52 can include nut threads 54 (i.e. an internal threaded region) for attachment to a correspondingly threaded shaft. As shown in the illustrated embodiment, the connector 50 can include a tubular stub 56, a radial shoulder 58 and a tool end 60. The connector tubular stub 56 is disposed within the transmission drum tubular stub 42 and the connector radial shoulder 58 bears against the transmission drum radial shoulder wall 44. The tool end 60 can be configured to engage a tightening tool head, for example, a hexagonal head or hexagonal aperture.

The transmission drum 40 and connector 50 can be—and preferably are—formed separately. In installation, the fixation of the connector 50 to the shaft of the belt driven accessory fixes the transmission drum 40 relative to the shaft of the belt driven accessory. If desired, the transmission drum 40 can be inter-connected to the connector 50, for example, through a press fit, prior to assembly in the decoupler pulley 10 to avoid loose parts post-assembly, prior to installation on the belt driven accessory.

In other embodiments, the transmission drum 40 and connector 50 can be manufactured as a single integral piece, for example, via machining operations on single block.

A bushing 62 journals the pulley 12 to the hub 32, enabling relative rotation therebetween. The bushing 62 includes a cylindrical bearing wall 64 that is disposed between the transmission drum cylindrical wall 46 and the pulley cylindrical wall 18. The bushing 62 can also include an end flange 66 which sits against an open end-face 48 of the transmission drum 40, prohibiting migration of the bushing 62 and reducing friction between and the pulley wall 30 and the transmission drum end face 48.

The transmission drum 40 and connector 50, along with the pulley pocket 20, define an annular cavity 68. A helical torsion coil spring 70 having a substantially rectangular cross-sectional profile is disposed in the annular cavity 68.

As seen best in in FIG. 1, the torsion spring 70 has a first end region 72 including a first spring end 74 pointing in a substantially circumferential direction, and a second end region 76 including a second spring end 78 pointing in a substantially circumferential direction. A majority of the torsion spring coils define an intermediate region 80 of the spring 70.

The first spring end region 72 is disposed in the pulley pocket 20 and connected to the pulley 12 via a non-clutched connection so as to be driven by the pulley 12 in substantially all operating conditions. In the illustrated embodiment, the first spring end 74 abuts or bear against the pulley spring stop 26 (see FIGS. 2 and 3) and the first end region 72 of the torsion spring 70 is press fit into the pulley pocket 20 so that the outer and inner circumferential pocket walls 22, 28 respectively securely grip the outer and inner and circumferential surfaces 82, 84 of the torsion spring 70 in its first end region 72. Other non-clutched connection means are also possible. For instance, the outer and inner circumferential pocket walls 22, 28 do not need to respectively grip or contact the outer and inner circumferential surfaces 82, 84 of the torsion spring 70 in its first end region 72 so that the drive is accomplished solely via abutment with the pulley spring stop 26. Other forms of abutment are also contemplated; for example, the first end region 72 can have a notch along the coil that is engaged by a corresponding lug provided in the pulley pocket 20. Alternatively, the abutment of the first spring end 74 can be omitted and the non-clutched connection accomplished through the secure grip of at least one of—and preferably both of—the outer and inner circumferential pocket walls 22, 28 against the corresponding outer and/or inner circumferential surfaces 82, 84 of the torsion spring 70 in its first end region 72. This can be accomplished, for example, by having the nominal diameter of the torsion spring 70 in the first end region 72 slightly larger than the inner diameter of the outer pocket wall and/or slightly smaller than the outer diameter of the inner pocket wall 28 so that a secure press fit is obtained.

In the illustrated embodiment, the first end region 72 extends over approximately one volute (360 degrees) of the torsion spring. The axial extent of the first end region 72 can vary somewhat in practice depending on several factors, including: whether the stop 26 is employed; the nominal diameter, width and spring rate of the torsion spring 70 in the first end region 72; the grip desired between the outer and inner and circumferential surfaces 82, 84 of the torsion spring 70 and the outer and inner circumferential pocket walls 22, 28; and/or the helix angle of the torsion spring 70. It is, however, best to limit the axial extent of the first end region 72 to preferably no more than two volutes as otherwise the decoupler 10 may not be suitable for automotive engines.

The intermediate region 80 of the torsion spring 70 is disposed within the transmission drum 40. In static condition the nominal diameters of the torsion spring coils in the intermediate region 80 are preferably sized less than the diameter of the transmission drum clutch engagement wall 46 to allow a meaningful range of twist in torsion spring 70, e.g., 30 to 90 degrees prior to lockup. (At lockup, the coils of the torsion spring 70 cannot expand any further so the pulley is locked to the hub at this point.)

The second spring end region 76 is disposed within the transmission drum 40, with the outer circumferential surface 82 of the torsion spring 70 in the second spring end region 76 engaging the transmission drum clutch engagement wall 46 so as to provides a clutched connection between the second spring end region 76 and the hub 32. For this purpose, the one or more coils of the torsion spring 70 in the second spring end region 76 can be formed with a nominal diameter larger than the diameter of the coils in the intermediate region 80. Alternatively, instead of varying the coil size, the transmission drum 40 may be formed in alternative embodiments to include an inwardly projecting step or slope therein (not shown) to engage the one or more coils of the torsion spring 70 in the second spring end region 76.

As shown in the illustrated embodiment, the second end region 76 can extend axially over approximately two volutes (720 degrees) of the torsion spring 70. The axial extent of the second end region 76 can vary in practice depending on various factors, including: the nominal diameter, width and spring rate of the torsion spring 70 in the second end region 76; the grip desired between the outer circumferential surface 82 of the torsion spring 70 in the second end region 76 and the transmission drum clutch engagement wall 46; and/or the helix angle in the second end region 76 of the torsion spring 70. Again, it is best to limit the axial extent of the second end region 76 to preferably no more than three or four volutes maximum as otherwise the decoupler 10 would not be suitable for automotive engines.

An axial retainer 90 can be press fit onto the pulley 12 under the wall guide 14*b* to substantially seal the pulley. An annular bushing 92 (see FIG. 2) can be disposed between the retainer 90 and the transmission drum radial shoulder wall 44 to prohibit binding between the two components. A sealing cap 94 can also be fitted at the other end of the pulley. Optionally, the bushing 92 may be formed as a single piece with the bushing 62.

In operation, the pulley 12 is rotated in a first rotational direction by the belt (not shown). As discussed above, the non-clutched connection between the pulley 12 and the first end region 72 and/or first end 74 of the torsion spring 70 causes the torsion spring 70 to be likewise driven in the first rotational direction, which tends to unwind or expand the torsion spring 70. The outer circumferential surface 82 of the torsion spring 70 in the second spring end region 76 preferably engages the transmission drum clutch engagement wall 46 in the static condition with sufficient grip so that there is substantially no or little slippage between the torsion spring 70 in the second spring end region 76 and the transmission drum clutch engagement wall 46 as the torsion spring 70 is driven in the first rotational direction, thereby driving the hub 32 and the belt-driven accessory fixed thereto in the first rotational direction with substantially no or little lag due to slippage. As long as there is a positive torque acting on the pulley 12 by the movement of the belt the torsion spring 70 will transmit the rotational movement of the pulley 12 to the hub 32 and the belt-driven accessory. During this movement, the coils of the torsion spring intermediate region 80 enable the hub 32 and hence the belt-driven accessory fixed thereto to be capable of instantaneous relative resilient rotational movements in opposite directions with respect to the pulley 12 during the driven rotational movement thereof as may be caused, for example, by cyclically fluctuating crankshaft torque. As the positive torque on the pulley 12 rises the torsion coil 70 expands to a greater degree increasing the grip in second spring end region 76 against the transmission drum 40, causing the outer circumferential surface 82 of one or more coils in the torsion spring intermediate region 80 to contact and engage the transmission drum clutch engagement wall 46. The transmission drum clutch engagement wall 46 may be formed from a resilient metallic material, such as sheet steel, or may incorporate a slot therein, resulting in increasing expansion of the transmission drum clutch engagement wall 46 and concomitantly increasing the friction on the bushing 62 pinched between the transmission drum 40 and the pulley 12. The decoupler pulley 10 thus provides a source of damping that is correlated (generally linearly) to the level of positive torque applied to the pulley 12.

When the rotational speed of the pulley 12 is decelerated by the belt to an extent sufficient to establish a negative torque between the pulley 12 and the hub 32, a relative rotation is induced in which the hub 32, while still rotating in the first rotational direction, tends to rotate relative to the pulley 12 in a direction opposite the first directional rotation due to the rotational inertia of the attached belt-driven accessory. This tendency induces the torsion spring 70 to contract, causing the transmission drum clutch engagement wall 46 to slip against the outer circumferential surface 82 of the torsion spring 70 in the second spring end region 76, thereby enabling the hub 32 and the belt-driven accessory affixed thereto to rotate at a speed greater than the rotational speed of the pulley 12. It will thus be seen that the second spring end region 76 functions as a wrap clutch with respect to the transmission drum clutch engagement wall 46.

As shown in the illustrated embodiment, the hub transmission drum clutch engagement wall 46 can have an axial length substantially co-extensive with the axial length of the pulley interior cylindrical wall 18 and at least substantially co-extensive with the axial extent of the intermediate region 80 of the torsion spring 70. This is preferred for a number of reasons. First, the decoupler pulley 10 does not utilize a roller bearing but rather only a bushing to prevent binding between the pulley 12 and hub 32 as these components rotate relative to one another. An axially long bushing can distribute forces, particularly radially asymmetrical forces, which may be imposed on the pulley by the belt, without unduly impacting a desired durability of the decoupler 10. Second, the hub transmission drum clutch engagement wall 46 can function to limit the maximum expansion of the torsion spring 70, thereby ensuring that the torsion spring 70 is not stressed beyond a predetermined level which could otherwise negatively impact the durability of the decoupler pulley. Third, this structure is optimal for generating proportional damping as discussed previously.

Figure 4:
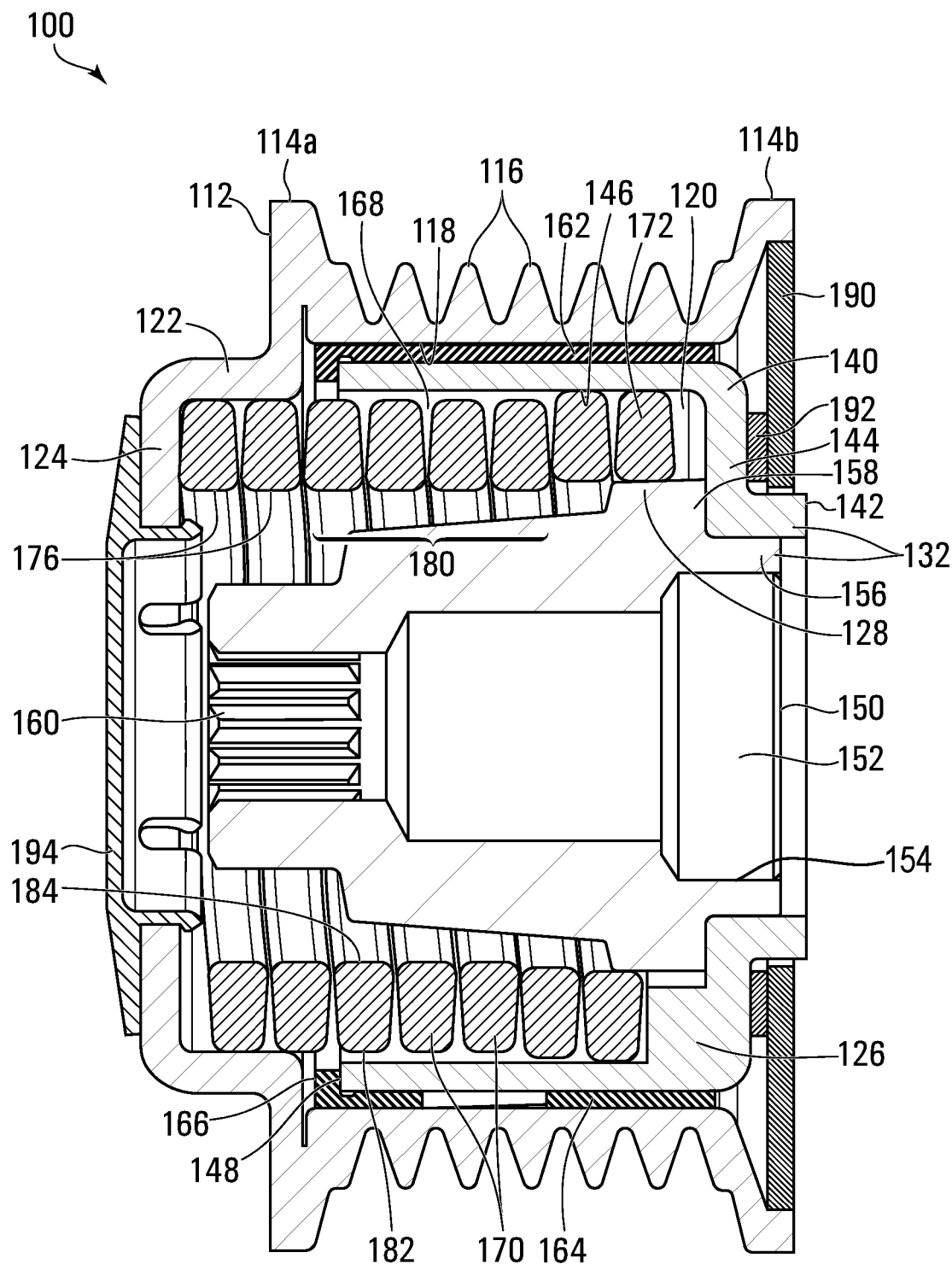
FIG. 4 is an axial cross sectional view of a decoupler pulley according to a second embodiment.

FIG. 4 shows a decoupler pulley 100 according to a second embodiment that is in some respect an operative reversal of the first embodiment in that the clutched connection is provided between the pulley and the second end of the torsion spring and the non-clutched connection is provided between the hub and the first end of the torsion spring. In this embodiment, the first end and the second end of the torsion spring are orientated in reverse compared to the first embodiment.

More particularly, the decoupler pulley 100 includes a rotatable, tubular, outer body ('pulley', for brevity) 112 having a belt engaging outer surface such as spaced-apart circumferential guide walls 114*a*, 114*b* which straddle a grooved surface 116 configured to receive a poly-V endless serpentine belt, as known in the art, for rotating the pulley. The walls 114*a*, 14*b* and the outer surface 116 may alternatively have any other configuration for mating with any other type of drive belt that may be deployed in practice. Internally, the pulley 112 can have a relatively smooth interior cylindrical wall 118 opposing the outer surface 116. On end of the pulley includes a cylindrical wall 122 and a radial end wall 124. As discussed in greater detail below the inner surface of the cylindrical wall 122 functions as a clutch engagement wall and thus wall 122 may be referred to herein as the pulley clutch engagement wall 122.

The decoupler 100 includes a hub 132 disposed for rotation inward of the pulley 112 as discussed in greater detail below. The hub 132 includes two major components, a transmission drum 140 and a connector 150 for fastening the hub 132 to the shaft of a belt driven accessory such as an alternator.

The transmission drum 140 can feature a tubular stub 142, a radial shoulder wall 144 and an axially extending cylindrical wall 146, which is disposed inward of the pulley cylindrical wall 118. The transmission drum 140 may be formed from a suitable metal, as discussed in greater detail below, and manufactured using well known roll forming techniques. In alternative embodiments, the transmission drum 140 may have other shapes, as previously discussed.

The connector 150 can provide a cavity 152 for attachment to the shaft of the belt driven accessory. The cavity 152 can include nut threads 154 for attachment to a correspondingly threaded shaft. As shown in the illustrated embodiment, the connector 150 can include a tubular stub 156, a radial shoulder 158 and a tool end 160. The connector tubular stub 156 is disposed within the transmission drum tubular stub 142 and the connector radial shoulder 158 bears against the transmission drum radial shoulder wall 144. The tool end 160 can be configured to engage a tightening tool head, as previously discussed.

One end of the hub 132 can have an internal, axially bounded, hub pocket 120 as provided, for example, between the transmission drum cylindrical wall 146 and a raised circumferential wall 128 provided in the connector 150. A spring stop 126 can be provided in the transmission drum 140.

The transmission drum 140 and connector 150 can be—and preferably are—formed separately. In installation, the fixation of the connector 150 to the shaft of the belt driven accessory fixes the transmission drum 140 relative to the shaft of the belt driven accessory. In other embodiments, the transmission drum 140 and connector 150 can be manufactured as a single integral piece, for example, via machining operations on single block.

A bushing 162 journals the pulley 112 to the hub 132, enabling relative rotation therebetween. The bushing 162 includes a cylindrical bearing wall 164 that is disposed between the transmission drum cylindrical wall 140 and the pulley cylindrical wall 118. The bushing 162 can also include an end flange 166 which sits against an open end-face 148 of the transmission drum 140, prohibiting migration of the bushing 162 and reducing friction between and the pulley and the transmission drum end face 48.

The transmission drum 140 and connector 150, along with pulley walls 122, 124 define an annular cavity 168. A helical torsion coil spring 170 having a substantially rectangular cross-sectional profile is disposed in the annular cavity 168. The torsion spring 170 has a first end region 172 including a first spring end 174 pointing in a substantially circumferential direction, and a second end region 176 including a second spring end 178 pointing in a substantially circumferential direction. A majority of the torsion spring coils define an intermediate region 180 of the spring 170.

The second spring end region 176 is disposed within the pulley 112 with the outer circumferential surface 182 of the torsion spring 170 in the second spring end region 176 engaging the pulley clutch engagement wall 122 so as to provide a clutched connection between the second spring end region 176 and the pulley 112. For this purpose, the one or more coils of the torsion spring 170 in the second spring end region 176 can be formed with a nominal diameter slightly larger than the diameter of the pulley clutch engagement wall 122.

As shown in the illustrated embodiment, the second end region 176 can extend axially over approximately two volutes (720 degrees) of the torsion spring 170. The axial extent of the second end region 176 can vary in practice depending on various factors, including: the nominal diameter, width and spring rate of the torsion spring 170 in the second end region 176; the grip desired between the outer circumferential surface 182 of the torsion spring 170 in the second end region 176 and the pulley clutch engagement wall 122; and/or the helix angle in the second end region 176 of the torsion spring 170. It is best to limit the axial extent of the second end region 176 to preferably no more than three or four volutes maximum as otherwise the decoupler 110 may not be suitable for automotive engines.

The intermediate region 180 of the torsion spring 170 is disposed within the transmission drum 140. In static condition the nominal diameters of the torsion spring coils in the intermediate region 180 are preferably sized less than the inside diameter of the transmission drum cylindrical wall 146 to allow a meaningful range of twist in torsion spring 70, e.g., 30 to 90 degrees prior to lockup.

The first spring end region 172 is disposed in the hub pocket 120 and connected to the hub 132 via a non-clutched connection. In the illustrated embodiment, the first spring end 174 abuts or bear against the hub spring stop 126 and the first end region 172 of the torsion spring 170 is press fit into the hub pocket 120 so that outer and inner hub pocket walls 146, 128 respectively securely grip the outer and inner and circumferential surfaces 182, 184 of the torsion spring 170 in its first end region 172. Other non-clutched connection means are also possible. For instance, the outer and inner hub pocket walls 146, 128 do not need to respectively grip or contact the outer and inner circumferential surfaces 182, 184 of the torsion spring 170 in its first end region 172 so that the non-clutched connection is accomplished solely via abutment with the hub spring stop 26. Other forms of abutment are also contemplated; for example, the first end region 172 can have a notch along the coil that is engaged by a corresponding lug provided in the hub pocket 120. Alternatively, the abutment of the first spring end 174 against the hub spring stop 126 can be omitted and the non-clutched connection accomplished through the secure grip of at least one of—and preferably both of—the outer and inner hub pocket walls 146, 128 against the corresponding outer and/or inner circumferential surfaces 182, 184 of the torsion spring 170 in its first end region 172. This can be accomplished, for example, by having the nominal diameter of the torsion spring 170 in the first end region 172 slightly larger than the inner diameter of the outer pocket wall 146 and/or slightly smaller than the outer diameter of the inner pocket wall 128 so that a secure press fit is obtained.

In the embodiment of FIG. 4, the spring first end region 172 extends over approximately one volute (360 degrees) of the torsion spring. The axial extent of the spring first end region 172 can vary somewhat in practice depending on several factors, including: whether the stop 126 is employed; the nominal diameter, width and spring rate of the torsion spring 170 in the first spring end region 172; the grip desired between the outer and inner and circumferential surfaces 182, 184 of the torsion spring 170 and the outer and inner hub pocket walls 146, 128; and/or the helix angle of the torsion spring 170. It is, however, best to limit the axial extent of the first end region 172 to preferably no more than two volutes as otherwise the decoupler 100 may not be suitable for automotive engines.

An axial retainer 190 can be press fit onto the pulley 112 under the wall guide 114b to substantially seal the pulley. An annular bushing 192 can be disposed between the retainer 190 and the transmission drum radial shoulder wall 144 to prohibit binding between the two components. A sealing cap 194 can also be fitted at the other end of the pulley.

In operation, the pulley 112 is rotated in a first rotational direction by the belt (not shown). The clutched connection between the pulley 112 and the second end region 176 of the torsion spring 170 tends to unwind or expand the torsion spring 170 when a positive torque exists between the pulley 112 and the hub 132 causing the second end region 176 of the torsion spring 170 to lock against the inside of the pulley clutch engagement wall 122. This causes the torsion spring 170 to be likewise driven in the first rotational direction and, as result of the non-clutched connection between the first end region 172 of the torsion spring 170 and the hub 132, driving the hub 132 and hence the shaft of the driven accessory in the first rotational direction. As long as there is positive torque acting on the pulley 112 by the movement of the belt the torsion spring 170 will transmit the rotational movement of the pulley 112 to the hub 132 and belt-driven accessory. During this movement, the coils of the torsion spring intermediate region 180 enable the hub 132 and hence the belt-driven accessory fixed thereto to be capable of instantaneous relative resilient rotational movements in opposite directions with respect to the pulley 112 during the driven rotational movement thereof as may be caused, for example, by cyclically fluctuating crankshaft torque. As the positive torque on the pulley 112 rises the torsion coil 170 expands to a greater degree increasing the grip in second spring end region 176 against the inside of the pulley clutch engagement wall 122 and causing the outer circumferential surface 182 of one or more coils in the torsion spring intermediate region 180 to contact and engage the transmission drum cylindrical wall 146. The transmission drum 140 may be formed from a resilient metallic material, such as sheet steel, or may incorporate a slot therein, resulting in increasing expansion of the transmission drum 140 and concomitantly increasing the friction on the bushing 162 pinched between the transmission drum 140 and the pulley 112. The decoupler pulley 100 thus provides a source of damping that is correlated (generally linearly) to the level of positive torque applied to the pulley 112.

When the rotational speed of the pulley 112 is decelerated by the belt to an extent sufficient to establish a negative torque between the pulley 112 and the hub 132, a relative rotation is induced in which the hub 132 which, while still rotating in the first rotational direction, tends to rotate relative to the pulley 112 in a direction opposite the first directional rotation due to the rotational inertia of the attached belt-driven accessory. This tendency induces the torsion spring 170 to contract, causing the inside of the pulley clutch engagement wall 122 to slip against the outer circumferential surface 182 of the torsion spring 170 in the second spring end region 176, thereby enabling the hub 132 and the belt-driven accessory affixed thereto to rotate at a speed greater than the rotational speed of the pulley 112. It will thus be seen that the second spring end region 176 functions as a wrap clutch with respect to the pulley clutch engagement wall 122.

As shown in the illustrated embodiment, the hub transmission drum cylindrical wall 146 can have an axial length substantially co-extensive with the axial length of the pulley interior cylindrical wall 118 and at least substantially co-extensive with the axial extent of the intermediate region 180 of the torsion spring 170 for the advantages described previously.

While the description contained herein constitutes a plurality of embodiments of the invention, it will be appreciated that the invention is susceptible to further modification and change without departing from the fair meaning of the accompanying claims.

PARTS LIST

| | | |
|---|---|---|
| Decoupler pulley | 10 | 1, 2, 3 |
| Pulley | 12 | 1, 2, 3 |
| Circumferential guide walls | 14a, 14b | 1, 2 |
| Outer grooved surface | 16 | 1, 2 |
| Interior cylindrical wall | 18 | 1, 2 |
| Pocket | 20 | 2, 3 |
| Outer circumferential wall | 22 | 2 |
| Radial wall | 24 | 2 |
| Spring stop | 26 | 3 |
| Inner circumferential wall | 28 | 2 |
| Internal flange | 30 | 2 |
| Hub | 32 | 2, 3 |
| Transmission drum | 40 | 1, 2, 3 |
| Tubular stub | 42 | 1, 2 |
| Radial shoulder wall | 44 | 1, 2 |
| Clutch engagement wall | 46 | 1, 2 |
| End face | 48 | 1, 2 |
| Connector | 50 | 1, 2, 3 |
| Cavity | 52 | 1, 2 |
| Tubular stub | 56 | 1, 2 |
| Radial shoulder | 58 | 1, 2 |
| Tool end | 60 | 1, 2 |
| Bushing | 62 | 1, 2, 3 |
| Cylindrical wall | 64 | 1, 2 |
| End flange | 66 | 1, 2 |
| Annular Cavity | 68 | 2 |
| Torsion Spring | 70 | 1, 2, 3 |
| First end region | 72 | 1, 2, 3 |
| First end | 74 | 1, 3 |
| Second end region | 76 | 1, 2, 3 |
| Second end | 78 | 1 |
| Intermediate Region | 80 | 1 |
| Outer circumferential surface | 82 | 2 |
| Inner circumferential surface | 84 | 2 |
| Retainer | 90 | 1, 2, 3 |
| Radial bushing | 92 | 2 |
| Cap | 94 | 1, 2 |
| Decoupler pulley | 100 | 4 |
| Pulley | 112 | 4 |
| Circumferential guide walls | 114a, 114b | 4 |
| Outer grooved surface | 116 | 4 |
| Interior cylindrical wall | 118 | 4 |
| Cylindrical clutch engagement wall | 122 | 4 |
| Radial end wall | 124 | 4 |
| Hub | 132 | 4 |
| Transmission drum | 140 | 4 |
| Tubular stub | 142 | 4 |
| Radial shoulder wall | 144 | 4 |
| Cylindrical wall | 146 | 4 |
| End face | 148 | 4 |
| Connector | 150 | 4 |
| Cylindrical wall | 128 | 4 |
| Cavity | 152 | 4 |
| Tubular stub | 156 | 4 |
| Radial shoulder | 158 | 4 |
| Tool end | 160 | 4 |
| Pocket | 120 | 4 |
| Spring stop | 126 | 4 |
| Bushing | 162 | 4 |
| Cylindrical wall | 164 | 4 |
| End flange | 166 | 4 |
| Annular Cavity | 168 | 4 |
| Torsion Spring | 170 | 4 |
| First end region | 172 | 4 |
| First end | 174 | 4 |
| Second end region | 176 | 4 |
| Second end | 178 | 4 |
| Intermediate Region | 180 | 4 |

-continued

PARTS LIST

| | | |
|---|---|---|
| Outer circumferential surface | 182 | 4 |
| Inner circumferential surface | 184 | 4 |
| Retainer | 190 | 4 |
| Radial bushing | 192 | 4 |
| Cap | 194 | 4 |

The invention claimed is:

1. A decoupler, comprising:
a rotatable pulley, the pulley having an outer surface configured to engage a drive belt;
a rotatable hub disposed inward of the pulley, the hub including a transmission drum and a connector for mounting the decoupler onto a belt-driven accessory shaft;
a torsion coil spring disposed inward of the pulley and the transmission drum, the torsion spring having a first end region including a first end pointing in a circumferential direction, a second end region including a second end pointing in a circumferential direction, and an intermediate region intermediate of the first and second end regions, wherein the first end region of the torsion spring is connected to one of the pulley and the hub via a non-clutched connection, and the second end region of the torsion spring is connected to the other of the pulley and the hub via a clutched connection; wherein, when the pulley and hub rotate relative to one another in a direction that tends to increase a diameter of the torsion coil spring, the second end region of the torsion spring is drivingly connected to the other of the pulley and the hub so as to impart the rotation of the pulley to the hub, and when the pulley and hub rotate relative to one another in a direction that tends to decrease the diameter of the torsion coil spring, the second end region of the torsion spring is decoupled from the other of the pulley and the hub so as to allow the hub to overrun the pulley; and
a bushing disposed between the pulley and the transmission drum, enabling the pulley and hub to rotate relative to one another, the bushing being substantially axially co-extensive with the axial extent of the intermediate region of the torsion spring.

2. A decoupler according to claim 1, wherein the transmission drum is radially expansible, and as the intermediate region of the torsion coil expands outwardly the transmission drum expands outwardly against the bushing to increasingly pinch the bushing between the transmission drum and the pulley, thereby providing damping correlated to a level of positive torque applied to the pulley.

3. A decoupler according to claim 2, wherein the transmission drum includes a slot therein enabling the radial expansion thereof.

4. A decoupler according to claim 1, wherein the non-clutched connection between the one of the pulley and the hub and the first end region of the torsion spring is provided at least in part by a stop provisioned in a pocket formed in the one of the pulley and the hub.

5. A decoupler according to claim 1, wherein the one of the pulley and the hub includes a pocket receiving the first end of the torsion spring and the non-clutched connection between the one of the pulley and the hub and the first end region of the torsion spring is provided at least in part by a press fit of the first end of the torsion spring into the pocket.

6. A decoupler according to claim 1, wherein the clutched connection between the second end region of the torsion spring and the other of the pulley and the hub is provided through wrap clutch engagement of the outer circumferential surface of the second end region of the torsion spring with a clutch engagement wall provided in the hub or pulley.

7. A decoupler according to claim 1, wherein the transmission drum and the connector are provisioned by separable pieces, and wherein fixation of the connector to the belt driven accessory shaft fixes the transmission drum to the belt driven accessory shaft.

8. A decoupler according to claim 7, wherein the transmission drum includes a radial shoulder wall, and the connector includes a radial shoulder which bears against the transmission drum radial shoulder wall when the connector is fixed to the belt driven accessory shaft.

9. A decoupler, comprising:
a rotatable pulley having an outer surface configured to engage a drive belt;
a rotatable hub disposed for rotation inward of the pulley, the hub including a transmission drum and a connector for mounting the decoupler onto a belt-driven accessory shaft, wherein the transmission drum and the connector are provisioned by separable pieces, and wherein fixation of the connector to the belt driven accessory shaft fixes the transmission drum to the belt driven accessory shaft;
a torsion coil spring disposed inward of the pulley and the transmission drum, the torsion spring having a first end region including a first end pointing in a circumferential direction, a second end region including a second end pointing in a circumferential direction, and an intermediate region intermediate of the first and second end regions, wherein the first end region of the torsion spring is connected to one of the pulley and the hub via a non-clutched connection, and the second end region of the torsion spring is connected to the other of the pulley and the hub via a clutched connection;
wherein, when the pulley and hub rotate relative to one another in a direction that tends to increase a diameter of the torsion coil spring, the second end region of the torsion spring is drivingly connected to the other of the pulley and the hub so as to impart the rotation of the pulley to the hub, and when the pulley and hub rotate relative to one another in a direction that tends to decrease the diameter of the torsion coil spring, the second end region of the torsion spring is decoupled from the other of the pulley and the hub so as to allow the hub to overrun the pulley.

10. A decoupler according to claim 9, including a bushing disposed between the pulley and the transmission drum, for enabling the pulley and hub to rotate relative to one another, the bushing being substantially axially co-extensive with the axial extent of the intermediate region of the torsion spring.

11. A decoupler according to claim 9, wherein the transmission drum is radially expansible, and as the intermediate region of the torsion coil expands outwardly the transmission drum expands outwardly against the bushing to increasingly pinch the bushing between the transmission drum and the pulley, thereby providing damping correlated to a level of positive torque applied to the pulley.

12. A decoupler according to claim 9, wherein the non-clutched connection between the one of the pulley and the hub and the first end region of the torsion spring is provided at least in part by a stop provisioned in a pocket formed in the one of the pulley and the hub.

13. A decoupler according to claim 9, wherein the one of the pulley and the hub includes a pocket receiving the first end of the torsion spring and the non-clutched connection between the one of the pulley and the hub and the first end region of the torsion spring is provided at least in part by press fit of the first end of the torsion spring into the pocket.

14. A decoupler according to claim 9, wherein the clutched connection between the second end region of the torsion spring and the other of the pulley and the hub is provided through wrap clutch engagement of the outer circumferential surface of the second end region of the torsion spring with a clutch engagement wall provided in the hub or pulley.

* * * * *